(12) United States Patent
Shigenobu et al.

(10) Patent No.: US 9,538,027 B2
(45) Date of Patent: Jan. 3, 2017

(54) DISPLAY CONTROL APPARATUS, IMAGE FORMING APPARATUS, AND COMPUTER-READABLE RECORDING MEDIUM STORING DISPLAY CONTROL PROGRAM

(75) Inventors: Dai Shigenobu, Osaka (JP); Yoshifumi Okabayashi, Osaka (JP); Takanori Miyamoto, Osaka (JP)

(73) Assignee: KYOCERA MITA CORPORATION, Osaka-shi (JP)

( * ) Notice: Subject to any disclaimer, the term of this patent is extended or adjusted under 35 U.S.C. 154(b) by 296 days.

(21) Appl. No.: 12/623,643

(22) Filed: Nov. 23, 2009

(65) Prior Publication Data

US 2010/0134831 A1 Jun. 3, 2010

(30) Foreign Application Priority Data

Nov. 28, 2008 (JP) ................. 2008-305630

(51) Int. Cl.
*H04N 1/00* (2006.01)
*G03G 15/00* (2006.01)
*G06F 3/12* (2006.01)

(52) U.S. Cl.
CPC ........ *H04N 1/00464* (2013.01); *G03G 15/502* (2013.01); *G03G 15/5075* (2013.01);
(Continued)

(58) Field of Classification Search
CPC ............ H04N 1/00973; H04N 1/00408; H04N 1/00411; H04N 1/00464; A63F 13/335; A63F 13/795; G03G 15/502; G03G 15/5075; G06T 11/206; H03M 7/30
USPC ............... 709/224, 223, 203, 220, 229, 238, 200,709/231, 201, 206, 212, 216, 217, 218, 225,709/227, 232, 237, 247; 358/1.15, 1.13, 1.14, 358/1.16, 474, 1.18, 1.2, 1.6, 1.8, 473, 508
IPC ..................... H04N 1/00973,1/00408, 1/00411, 1/00464; A63F 13/335, 13/795; G03G 15/502, 15/5075; G06T 11/206 ; H03M 7/30
See application file for complete search history.

(56) References Cited

U.S. PATENT DOCUMENTS 6,654,060 B1* 11/2003 Kurosawa .......... H04N 5/23203
348/14.04
2002/0126306 A1* 9/2002 Chohsa ................ G06F 3/1205
358/1.13
(Continued)

FOREIGN PATENT DOCUMENTS

| JP | 2001-142948 | 5/2001 |
|---|---|---|
| JP | 200291856 | 3/2002 |
| JP | 2002182833 | 6/2002 |

*Primary Examiner* — Negussie Worku
(74) *Attorney, Agent, or Firm* — Gerald E. Hespos; Michael J. Porco; Matthew T. Hespos (57) ABSTRACT

A display control apparatus includes; a display unit; a web display control unit which causes a web page to be displayed; an instruction acceptance image display control unit which causes a download instruction acceptance image to be displayed in a web page; a download instruction acceptance unit which accepts a download instruction in accordance with an operation based on the download instruction acceptance image; a processing acceptance image display control unit which displays a processing acceptance image for accepting an instruction for carrying out printing, saving or transmission in respect of the data to be downloaded, when the download instruction is accepted; and a processing acceptance unit which accepts the selection of any one of the aforementioned processes in accordance with an user's operation based on the processing acceptance image.

2 Claims, 8 Drawing Sheets

(52) U.S. Cl.
CPC ..... *H04N 1/00244* (2013.01); *H04N 1/00411* (2013.01); *H04N 1/00424* (2013.01); *H04N 1/00472* (2013.01); *H04N 1/00474* (2013.01); *H04N 1/00506* (2013.01); *H04N 1/00973* (2013.01); *G06F 3/1293* (2013.01); *H04N 1/00204* (2013.01); *H04N 2201/0039* (2013.01)

(56) References Cited

U.S. PATENT DOCUMENTS

| | | | |
|---|---|---|---|
| 2007/0109577 A1* | 5/2007 | Yoshida | H04N 1/0035 358/1.13 |
| 2007/0168418 A1* | 7/2007 | Ratnakar | 709/204 |
| 2008/0059906 A1* | 3/2008 | Toki | 715/810 |
| 2008/0187248 A1* | 8/2008 | Ikeda | H04N 1/0044 382/305 |

\* cited by examiner

DISPLAY CONTROL APPARATUS, IMAGE FORMING APPARATUS, AND COMPUTER-READABLE RECORDING MEDIUM STORING DISPLAY CONTROL PROGRAM

BACKGROUND OF THE INVENTION

1. Field of the Invention

The present invention relates to a display control apparatus, an image forming apparatus and a computer-readable recording medium storing a display control program, and more particularly, to technology for displaying a web page on a display unit.

2. Description of the Related Art

Conventionally, a display unit, consisting of a LCD (Liquid Crystal Display) or the like, is provided in an image forming apparatus, such as a copying machine or composite machine (a machine which combines a copying function, printer function facsimile function and scanner function), or the like, in order to display an operating guide, or the like, to a user. Furthermore, a service coupon issuing system is known according to which, when a user operates a service coupon download button on a web page which is displayed on the display unit of a user terminal, a distribution document database connected to the network is accessed, and an electronic document file for distributing a service coupon is downloaded from the database to the user's terminal.

SUMMARY OF THE INVENTION

The present invention further improves the prior art technology described above.

In other words, the present invention is a display control apparatus, comprising: a display unit which displays images; and a web browser function unit which causes the display unit to display a web page, wherein the web browser function unit comprises: an instruction acceptance image display control unit which displays, in a web page displayed on the display unit, a download instruction acceptance image for accepting from a user, by a touch panel function, an instruction for downloading link destination data from a link destination associated with a web page; a download instruction acceptance unit which accepts the download instruction in accordance with an operation performed by the user on the basis of the download instruction acceptance image; a processing acceptance image display control unit which causes the display unit to display a processing acceptance image for accepting from the user, by the touch panel function, one process to be performed of a predetermined plurality of processes in respect of the link destination data to be downloaded, when the download instruction is accepted by the download instruction acceptance unit; and a processing acceptance unit which accepts the selection of the one process of the plurality of processes in accordance with an operation performed by the user on the basis of the processing acceptance image.

DETAILED DESCRIPTION OF THE PREFERRED EMBODIMENTS

Figure 1:
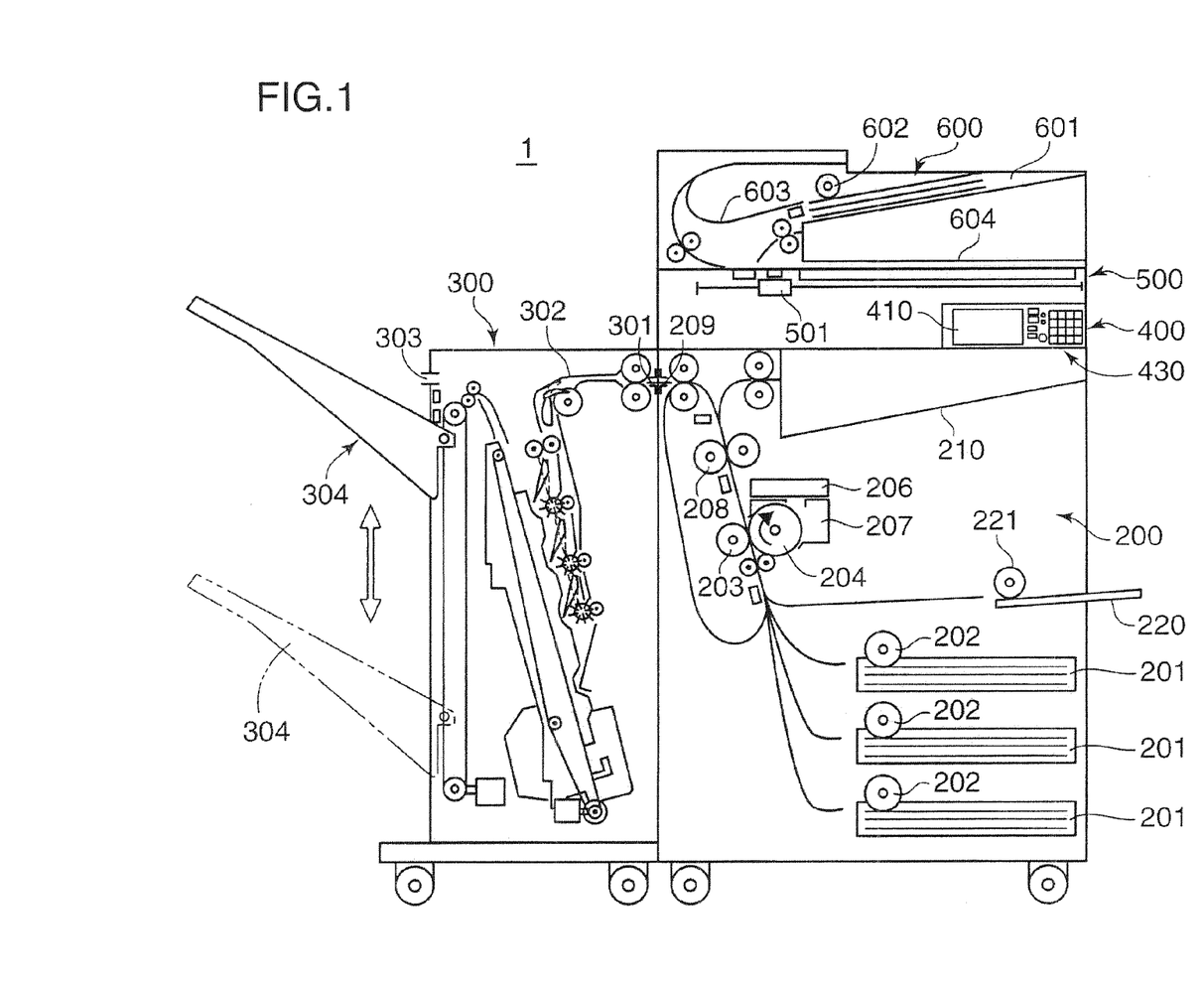
FIG. 1 is a general side view diagram showing the composition of a composite machine which is one embodiment of an image forming apparatus comprising a display control apparatus relating to the present invention.

Below, an embodiment of an image forming apparatus comprising a display control apparatus relating to the present invention will be described. FIG. 1 is a general side view diagram showing the composition of a composite machine which is one embodiment of an image forming apparatus comprising a display control apparatus relating to the present invention.

The composite machine 1 comprises: a main unit 200, a paper post-processing unit 300 which is disposed on the paper output side, for example, the left-hand side, of the main unit 200, an operating unit 400 whereby a user can input various operating instructions, and the like, an original reading unit 500 which is disposed above the main unit 200, and an original supply unit 600 which is disposed above the original reading unit 500.

The operating unit 400 comprises a display unit 410 consisting of a LCD (Liquid Crystal Display) or the like, and an operating key unit 430 by which a user inputs operating instructions. The operating key unit 430 comprises a start key and a keypad, and the like.

The original supply unit 600 comprises an original placement section 601, a paper supply roller 602, an original conveyance section 603 and an original output section 604, and the original reading unit 500 comprises a scanner 501. The paper supply roller 602 feeds out a prescribed number of sheets of an original document set on the document placement section 601, one sheet at a time, and the original conveyance unit 603 conveys the original thus fed out, successively, to a reading position of the scanner 501. The scanner 501 successively reads in the image of the conveyed original, and the original which has been read is then output to the original output section 604.

The main unit 200 comprises a plurality of paper supply cassettes 201, a plurality of paper supply rollers 202, a transfer roller 203, a photosensitive drum 204, an exposure apparatus 206, a developer apparatus 207, a pair of fixing rollers 208, an output opening 209, an output tray 210, and the like.

The photosensitive drum 204 is charged uniformly by a charging apparatus (not illustrated) while rotating in the direction indicated by the arrow. The exposure apparatus 206 forms an electrostatic latent image on the surface of the drum by scanning laser light modulated in accordance with the image data of the original read in by the original reading unit 500, onto a photosensitive drum 204. The developer apparatus 207 forms a toner image by supplying black-colored developer onto the photosensitive drum 204.

On the other hand, a paper supply roller 202 draws out printing paper from a paper supply cassette 201 in which printing paper is accommodated, and conveys the paper to the transfer roller 203. The transfer roller 203 transfers the toner image on the photosensitive drum 204 onto the conveyed printing paper, and the fixing roller 208 fixes the transferred toner image onto the printing paper by heating the toner image. Thereupon, the printing paper is conveyed from the output opening 209 of the main unit 200 to the paper post-processing unit 300. Furthermore, the printing paper is also output to the output tray 210, according to requirements.

The paper post-processing unit 300 comprises an input opening 301, a printing paper conveyance unit 302, an output opening 303, a stack tray 304, and the like. The printing paper conveyance unit 302 successively conveys the printing paper introduced from the output opening 209 into the input opening 301, and finally outputs the printing paper from the output opening 303 to the stack tray 304. The stack tray 304 is composed so as to be movable upwards and downwards in the direction of the arrows, in accordance with the number of sheets of printing paper conveyed out from the output opening 303.

Figure 2:
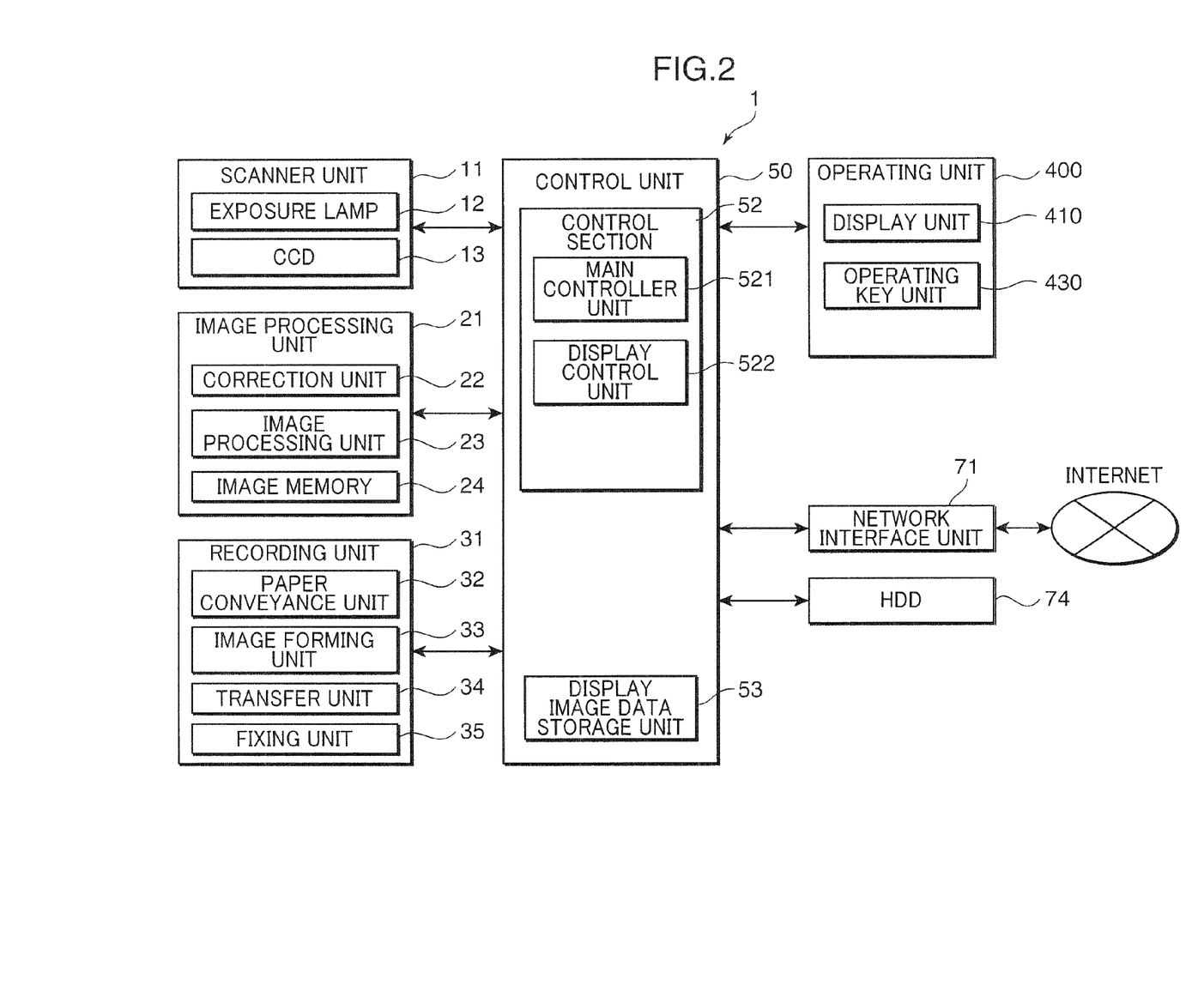
FIG. 2 is a block diagram of the control of the composite machine.

FIG. 2 is a block diagram of the control of the composite machine 1. The composite machine 1 comprises a scanner unit 11, an image processing unit 21, a recording unit 31, an operating unit 400, a control unit 50, a network interface (interface) unit 71, and an HDD (hard disk drive) 74.

The scanner unit 11 includes an exposure lamp 12 and a CCD (charge coupled device) 13 which constitute the scanner 501 shown in FIG. 1. The scanner unit 11 illuminates the original document by means of the exposure lamp 12 and receives reflected light from the original by means of the CCD 13, thereby reading in an image from the original, and outputs image data corresponding to the image thus read to the image processing unit 21.

The image processing unit 21 comprises a correction unit 22, an image treatment unit 23 and an image memory 24. The image processing unit 21 processes the read image data by means of the correction unit 22 and the image treatment unit 23 in accordance with requirements, and stores the processed image data in the image memory 24 and outputs same to the recording unit 31. The correction unit 22 carries out prescribed correction processing, such as level correction, gamma correction, and the like, on the image data that has been read in. The image treatment unit 23 carries out various treatment processes, such as compression or decompression of the image data, image enlargement or reduction, and so on.

The recording unit 31 comprises a paper conveyance unit 32 which is constituted by the paper supply cassettes 201 and the paper feed rollers 202 shown in FIG. 1, and the like, an image forming unit 33 which is constituted by the photosensitive drum 204, the exposure apparatus 206 and the developer apparatus 207 shown in FIG. 1, and the like, a transfer unit 34 which is constituted by the transfer roller 203 shown in FIG. 1, and the like, and a fixing unit 35 which is constituted by the fixing roller 208 shown in FIG. 1, and the like. The recording unit 31 uses the original document data read out by the scanner unit 11 to print an image on the recording paper. More specifically, the paper conveyance unit 32 conveys the recording paper to the image forming unit 33, which forms a toner image corresponding to the image data, the transfer unit 34 transfers the toner image onto the recording paper, and the fixing unit 35 forms an image by fixing the toner image onto the recording paper.

The network interface unit 71 uses a network interface, or the like, to control the transmission and reception of data of various types to and from external apparatuses, via a LAN (Local Area Network) on the basis of an Ethernet connection (registered trademark), or the like, as well as connecting to the Internet. The HDD 74 stores the image data read by the scanner unit 11 and an output format set for that image data, and the like.

The operating unit 400 comprises the display unit 410 and the operating key unit 430 shown in FIG. 1. The display unit 410 is constituted, for example, by a touch panel unit which combines a touch panel and an LCD. The display unit 410 displays various operating screens, as well as enabling the user to input instructions for executing functions of various types by touching the display screen (a displayed operating key section). The operating key unit 430 has a start key and a keypad, and the like, as described above.

The control unit 50 comprises a control section 52 and a display image data storage section 53.

The control section 52 comprises a main controller unit 521 and a display control unit 522. The main controller unit 521 controls the operation of the composite machine 1. The display control unit 522 controls display in order that operating guide information for the composite machine 1 and web pages, and the like, are displayed to the user on the display unit 410. The display image data storage unit 53 stores image data of various types to be displayed on the display unit 410. The image data of various types stored in the display image data storage unit 53 consists of images which provide the user with a display of various operating guide information for the composite machine 1.

Figure 3:
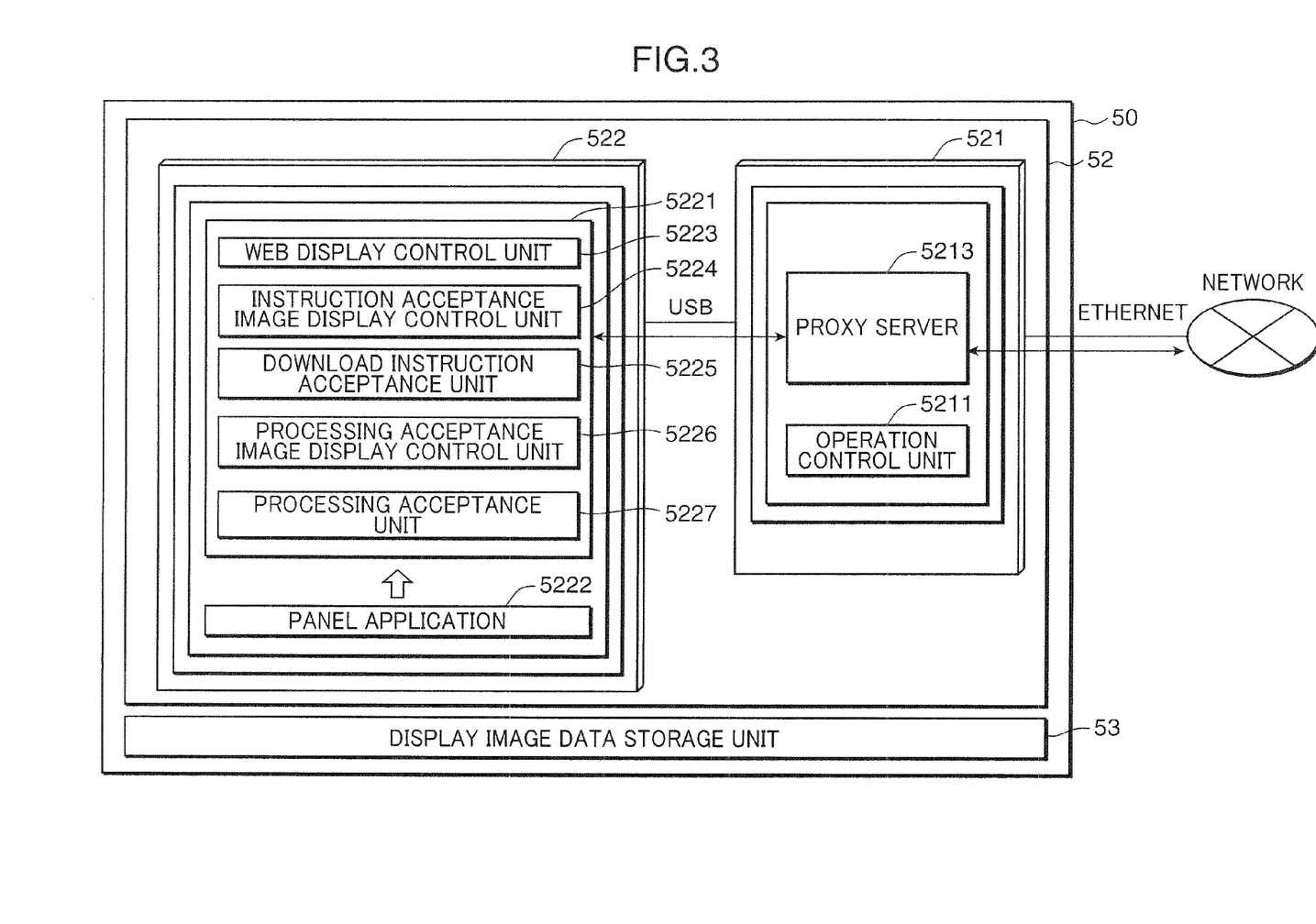
FIG. 3 is a diagram showing an extracted view of the composition of the control unit of the composite machine.

FIG. 3 is a diagram showing an extracted view of the composition of the control unit 50 of the composite machine 1. As described above, the control unit 50 comprises a main controller unit 521 and a display control unit 522. The main controller unit 521 consists of a CPU, for example, and the display control unit 522 consists of an ASIC (Application Specific Integrated Circuit), for example; the respective ports constituting these are connected by USB (Universal Serial Bus), for example.

The main controller unit 521 comprises an operation control unit 5211 and a proxy server 5213.

The operation control unit 5211 controls the operations of the various sections of the composite machine 1 (the scanner unit 11, the image processing unit 21 and the recording unit 31, and the like).

The proxy server 5213 connects to the Internet via a web browser function unit 5221 and an Internet network. The proxy server 5213 is connected to the Internet via an Ethernet, or the like.

The display control unit 522 comprises a web browser function unit 5221 and a panel application 5222, for example.

The web browser function unit 5221 executes processing required in order to display an Internet web page on the display unit 410.

The panel application 5222 executes processing required in order to display various operating guides for the composite machine 1, or the like, on the display unit 410. The panel application 5222 reads out image data corresponding to the respective operating guides for the composite machine 1, from the display image data storage unit 53 and displays this image data on the display unit 410.

Furthermore, the web browser function unit 5221 comprises a web display control unit 5223, an instruction acceptance image display control unit 5224, a download instruction acceptance unit 5225, a processing acceptance image display control unit 5226, and a processing acceptance unit 5227.

The web display control unit 5223 carries out processing required in order to display a web page on the display unit 410.

The instruction acceptance image display control unit 5224 displays a download instruction acceptance image on the web page displayed on the display unit 410 by the web display control unit 5223. The download instruction acceptance image is an image which is displayed in order to accept from the user, by means of a touch panel function of the display unit 410, an instruction for downloading data which is stored as a download object in a link destination which is linked to the web page displayed on the display unit 410 (hereinafter, this data is called "link destination data").

The download instruction acceptance unit 5225 accepts a download instruction for downloading the link destination data by means of an operation performed by the user on the basis of the download instruction acceptance image. In the present embodiment, it is supposed that the download of the link destination data from the link destination of the web page being displayed on the display unit 410 is carried out by the web browser function unit 5221. However, the present invention is not limited to a composition in which the download of link destination data from the link destination is performed by the web browser function unit 5221.

When the download instruction acceptance unit 5225 has accepted the download instruction, the processing acceptance image display control unit 5226 displays a processing acceptance image on the display unit 410. The processing acceptance image is an image displayed in order to accept from the user by means of a touch panel function, one process out of printing, data saving or data transmission, to be performed in respect of the downloaded link destination data.

The processing acceptance unit 5227 accepts an instruction for selecting which process out of printing, data saving or data transmission (examples of the plurality of processes stated in the claims) is to be performed in respect of the link destination data that has been downloaded, on the basis of an operation performed by the user on the basis of the processing acceptance image. Printing means recording onto recording paper by the recording unit 31. Data saving means saving data by storing data on the HDD 74, or the like. Data transmission means sending data via a LAN or the Internet to a transmission destination specified by an operation of the operating unit 400 performed by the user or to a predetermined transmission destination, by means of the network interface unit 71.

In the present embodiment, when a selection instruction for any one process, of the printing, data saving or data transmission processes described above, has been accepted by the processing acceptance unit 5227, the web browser function unit 5221 accesses the link destination (web page or database, or the like) indicated by the download instruction accepted by the download instruction acceptance unit 5225, and a task of downloading the link destination data from the link destination is started.

The display control apparatus relating to one embodiment of the present invention comprises, for example, the control unit 50 and the display unit 410.

An example was described above in which the control unit 52 comprises a main controller unit 521 consisting of a CPU and a display control unit 522 consisting of an ASIC, but the composition is not limited to this and it is also possible to achieve the functions of the web browser function unit 5221 described above by storing a display control program relating to one embodiment of the present invention in the HDD 74 and running a control unit 52 consisting of a CPU, or the like, in accordance with this display control program, in addition to which, moreover, the control unit 52 may also function as the panel application 5222, the operation control unit 5211 and the proxy server 5213. This display control program is stored in a computer-readable recording medium, and is read out from the recording medium by the control unit 52 and stored on the HDD 74.

Figure 4:
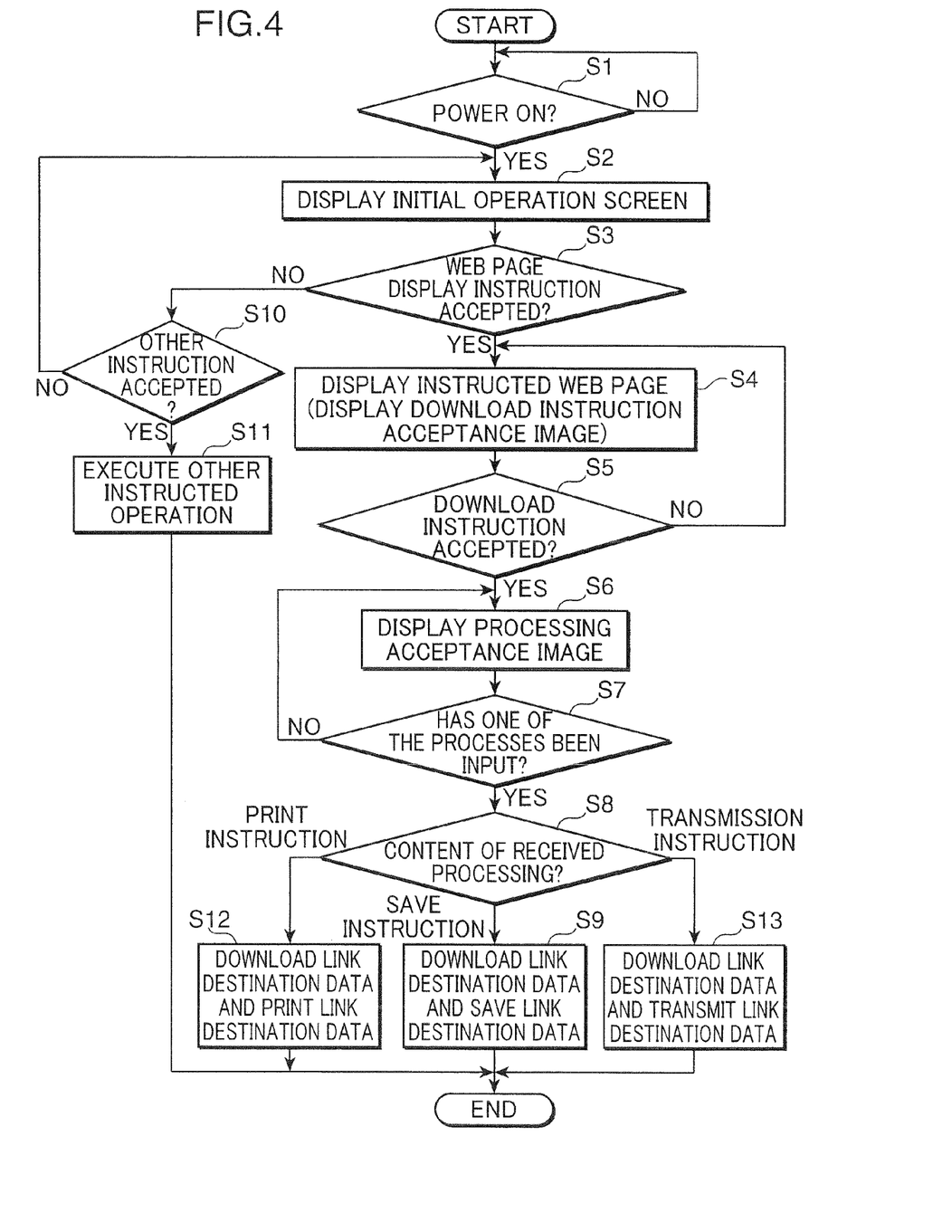
FIG. 4 is a flowchart showing a first embodiment of display control in a display unit of the composite machine.
Figure 5:
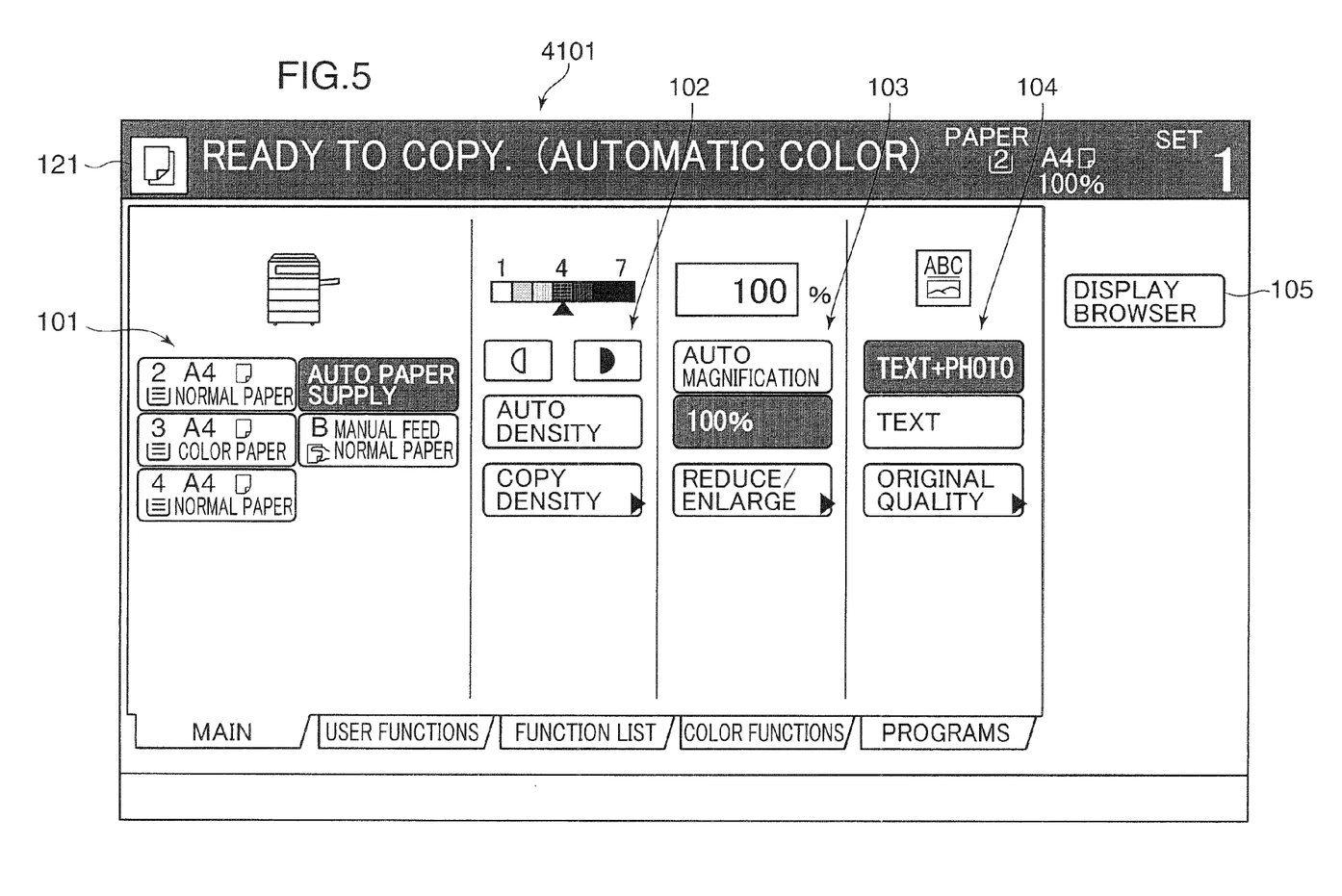
FIG. 5 is a diagram showing an example of an initial operating screen.
Figure 6:
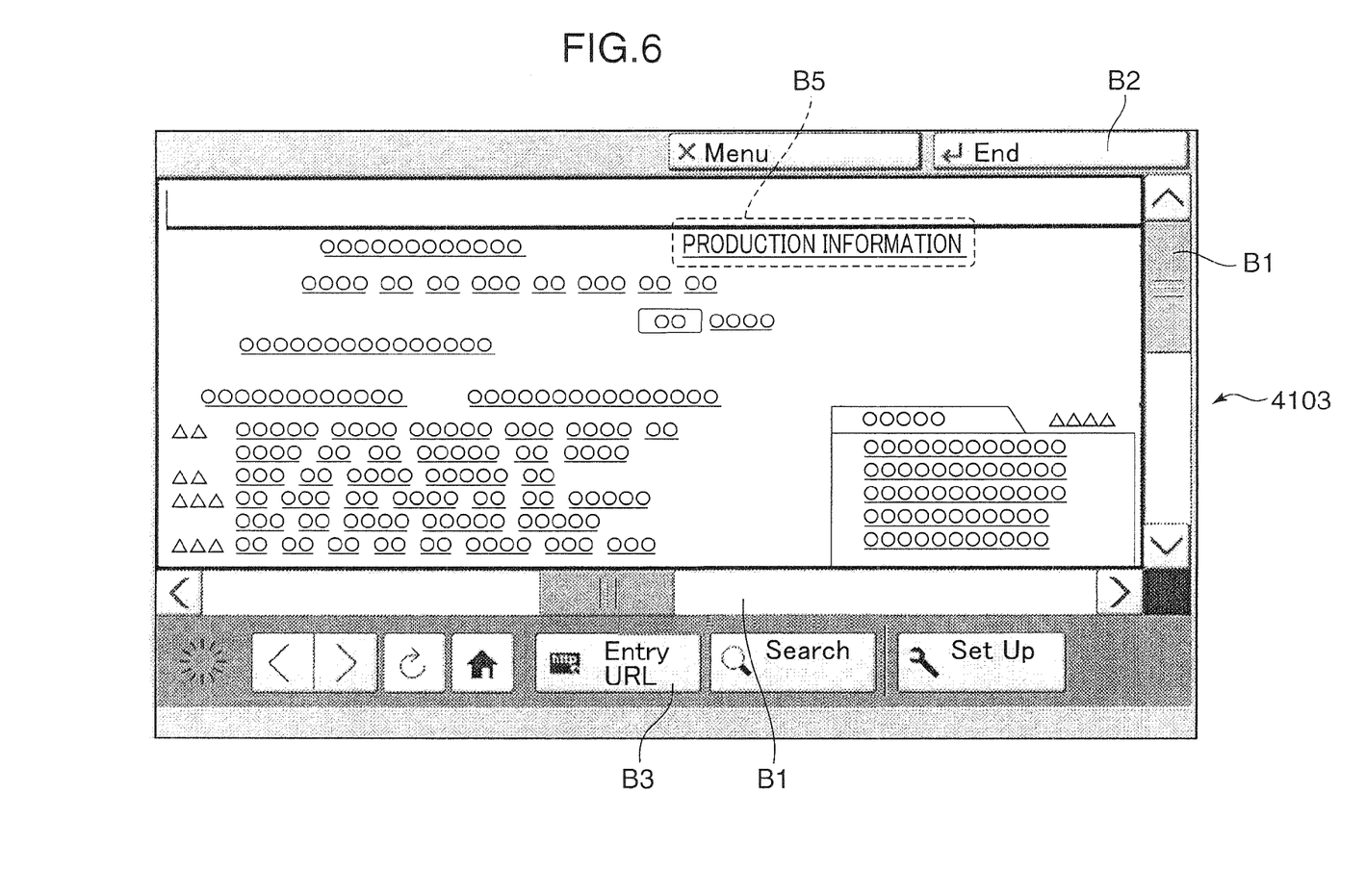
FIG. 6 is a diagram showing an example of a web page display screen.
Figure 7:
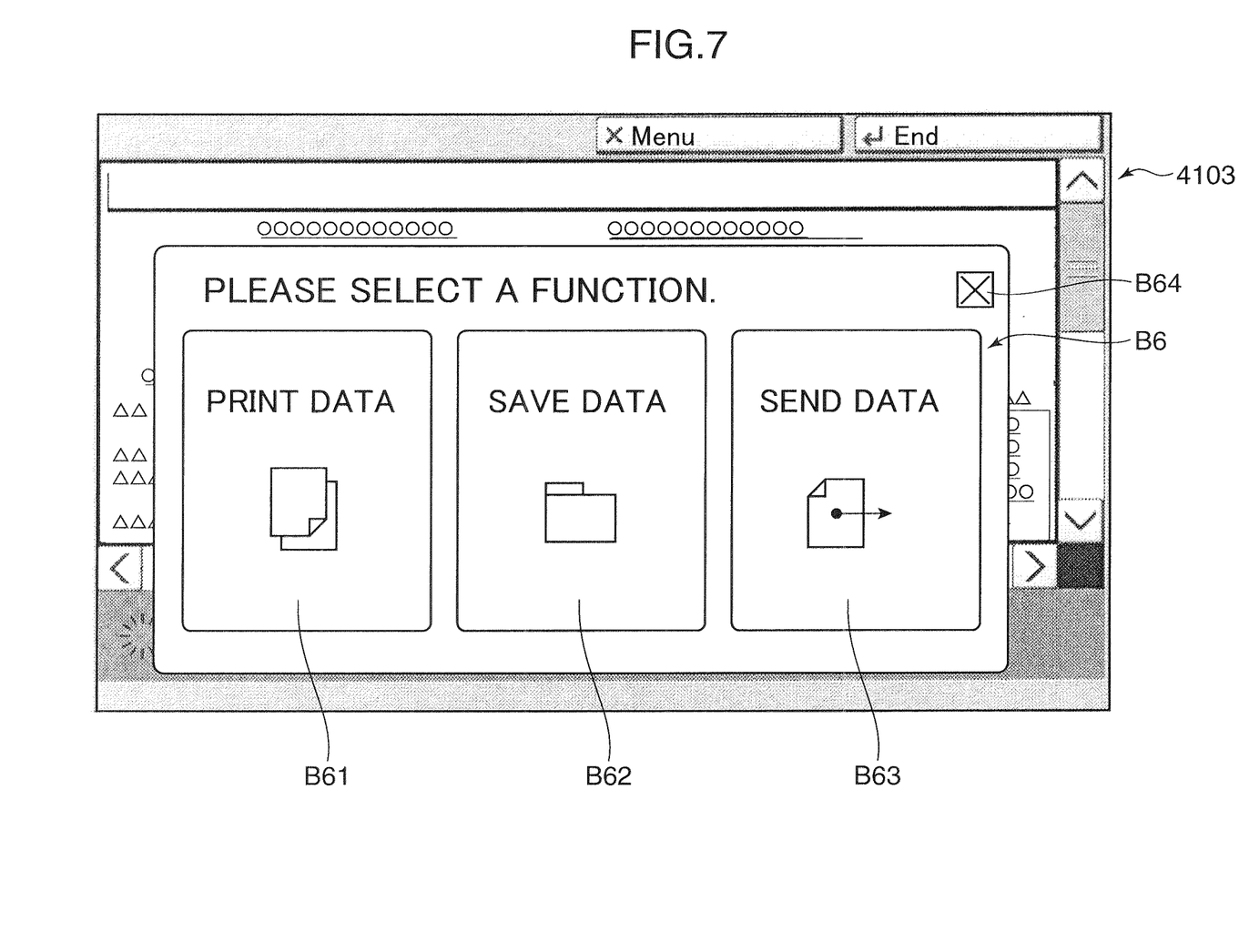
FIG. 7 is a diagram showing an example of the display of a processing acceptance image.

Next, a first embodiment of display control in a display unit 410 of the composite machine 1 will be described. FIG. 4 is a flowchart showing a first embodiment of display control in a display unit 410 of the composite machine 1. FIG. 5 is a diagram showing an example of an initial operating screen. FIG. 6 is a diagram showing an example of a web page display screen. FIG. 7 is a diagram showing an example of the display of a processing acceptance image.

When the user switches on the main power supply of the composite machine 1 when starting to use the composite machine 1 (YES at S1), the panel application 5222 reads out the image data corresponding to the initial operating screen from the display image data storage unit 53, and causes an initial screen 4101 such as that shown in FIG. 5 to be displayed on the display unit 410 (S2). In this case, the operating unit 400 assumes a state capable of accepting various operation execution instructions from the user (such as a copy operation execution instruction or a web page display instruction) (S3, S10). As shown in FIG. 5, this initial screen 4101 displays keys 101 to 104, or the like, for accepting various settings during a copy operation, for instance, as well as displaying a browser key 105 for accepting a web browser start instruction for starting up a web browser (an instruction for displaying a predetermined web page on the display unit 410 upon startup of the web browser), from the user. The keys displayed on the initial screen 4101 and the respective screens described below are used to accept the input of instructions from the user in the web browser function unit 5221 and the operation control unit 5211, and the like, by means of a touch panel function.

Here, if any operation execution instruction other than a web page display instruction, for example, a copy operation execution instruction is input by the operation of the operating unit 400 by the user, and if this instruction has been accepted by the operating unit 400 (NO at S3, YES at S10), then the operation control unit 5211 executes the instructed operation, for example, a copying operation (S11). If the operating unit 400 has not accepted any operation execution instruction from the user (NO at S10), then the processing returns to S2, the panel application 5222 causes the initial screen 4101 to be displayed on the display unit 410, and the operation unit 400 continues in a state of waiting for the input of an operation execution instruction from the user.

If, on the other hand, the user has pressed the browser key 105 on the initial screen 4101 and a web page display instruction has been accepted by the web display control unit 5223 via a touch panel function (YES at S3), then the web display control unit 5223 accesses the web site of the web page which has previously been established as the first page when displaying the web browser, via the proxy server 5213, acquires image data for the web page forming the first page, and displays a web page display screen 4103 such as that shown in FIG. 6, for example, on the display unit 410 (S4). In other words, the web display control unit 5223 switches the initial screen 4101 shown on the display unit 410 by the panel application 5222 to the web page display screen 4103 described above.

In this case, if a link (a function which links the web page to another home page or database, or the like (a function which specifies a URL using an href attribute in the a element (link element) of an HTML document)) is appended to the web page displayed on the display unit 410, then the instruction acceptance image display control unit 5224 displays a download instruction acceptance image B5 such as that shown in FIG. 6, for instance, inside the web page display screen 4103, for each link destination. For the download instruction acceptance image, it is possible to use, as the download instruction acceptance image B5, a hyperlink image which transfers the screen to a link destination which is linked to the web page that is displayed as the web page display screen 4103. In the present embodiment, an example is shown in which the display of a hyperlink is used as the download instruction acceptance image B5. FIG. 6 depicts one hyperlink display which is shown inside the web page display screen 4103 as the download instruction acceptance image B5, but it is also possible to use all of the hyperlinks displayed or only a desired number of hyperlinks, as the download instruction acceptance image B5.

Furthermore, the web display control unit 5223 causes a scroll bar B1 and a screen close button B2, and the like, to be displayed on the web page display screen 4103. The scroll bar B1 and the screen close button B2, and the like, are set to a size that is easy to touch by the user with his or her finger, in order that the user can easily carry out an operation of scrolling the web page or closing the web page, or the like, by using a touch panel function.

Although not shown in FIG. 4, if the user presses on the screen close button B2 while the web display control unit 5223 is causing the web page display screen 4103 to be displayed on the display unit 410, and a screen close instruction is accepted by the web display control unit 5223 by means of a touch panel function, then the web display control unit 5223 halts the display of the web page display screen 4103 and transfers to the display processing (S2) of the initial operation screen 4101 by the panel application 5222.

As described above, if the user presses the download instruction acceptance image B5 while the web display control unit 5223 is causing the display unit 410 to display a web page display screen 4103, then by means of a touch panel function, an instruction for downloading link destination data from the link destination associated with the download instruction acceptance image B5 is accepted by the download instruction acceptance unit 5225. The link destination data is data forming a download object and is (1) HTML data, for example, of the actual web page specified by a URL as the link destination associated with the download instruction acceptance image B5, and (2) software data, audio data in MP3 format, or the like, or image data in jpeg format, or the like, which has been stored as data for download in the location specified by a URL as the link destination.

Here, if the download instruction acceptance image B5 is pressed by the user and a download instruction for the link destination data has been accepted by the download instruction acceptance unit 5225 (YES at S5), then the processing acceptance image display control unit 5226 causes the display unit 410 to display a processing acceptance image B6 such as that shown in FIG. 7, for example, either in a superimposed fashion over the web page display screen 4103 being displayed or instead of this web page display screen 4103 (S6).

The processing acceptance image B6 comprises a print instruction acceptance image B61, a data saving instruction acceptance image B62, a data transmission instruction acceptance image B63 and a screen close button B64.

The print instruction acceptance image B61 is an image for accepting, from the user via a touch panel function, an instruction for carrying out printing of the link destination data. The data saving instruction acceptance image B62 is an image for accepting from the user via a touch panel function an instruction for storing and saving the link destination data in the HDD 74 or a memory (not illustrated).

The data transmission instruction acceptance image B63 is an image for accepting from the user via a touch panel function an instruction for transmitting the link destination data from the network interface unit 71 (data transmission unit) to a transmission destination designated by an operation of the operating unit 400 performed by the user (the transmission destination being a personal computer, or the like, connected to the LAN or the Internet), or to the aforementioned transmission destination previously established and stored in the control section 52 or the network interface unit 71. The designation of the transmission destination is made in the following manner. For example, when the user presses a keyboard display key (not illustrated) provided as one key of the operating key unit 430 on the operating unit 400, the web browser function unit 5221 causes the display unit 410 to display a keyboard image for accepting the input of text and symbols from the user, by means of a touch panel function. In accordance with the pressing of the text or symbol keys displayed on the keyboard screen, by means of a touch panel function, the web browser function unit 5221 accepts a plurality of text characters or symbols corresponding to the keys which have been pressed. The control unit 52 receives an IP address or email address indicated by the group of input text characters and symbols, from the web browser function unit 5221, and sends the downloaded link destination data via the network interface unit 71 to a personal computer in the LAN indicated by the IP address or to a transmission destination indicated by the email address.

If the user presses any one of the print instruction acceptance image B61, the data saving instruction acceptance image B62 or the data transmission instruction acceptance image B63, while the processing acceptance image display control unit 5226 is displaying the processing acceptance image B6 on the display unit 410 as described above (S6), then the processing acceptance unit 5227 judges which instruction, of a print instruction, a data saving instruction or a data transmission instruction, has been input (S7).

If the processing acceptance unit 5227 accepts the input of an instruction for any one of the aforementioned processes (YES at S7), then the processing acceptance unit 5227 judges whether the contents of the instruction accepted by the user's pressing action is either a print instruction, a data saving instruction or a data transmission instruction, on the basis of which of the print instruction acceptance image B61, the data saving instruction acceptance image B62 or the data transmission instruction acceptance image B63 has been pressed by the user (S8).

If the processing acceptance unit 5227 has judged that the content of the received instruction was a print instruction ("print instruction" at S8), then the web browser function unit 5221 downloads the link destination data from the link destination associated with the download instruction acceptance image B5, in addition to which the control unit 52 carries out recording (printing) based on the downloaded link destination data, onto recording paper, by means of the recording unit 31 (S12). The downloaded link destination data is stored temporarily in the HDD 74 or a memory (not illustrated) and is used for the recording operation by the recording unit 31.

Furthermore, if the processing acceptance unit 5227 has judged that the content of the received instruction was a data saving instruction ("save instruction" at S8), then the web browser function unit 5221 downloads the link destination data from the link destination associated with the download instruction acceptance image B5, in addition to which the control unit 52 stores and saves the downloaded link destination data to the HDD (storage unit) 74 or to a memory (not illustrated) or the like (S9).

Furthermore, if the processing acceptance unit 5227 has judged that the content of the received instruction was a data transmission instruction ("transmission instruction" at S8), then the web browser function unit 5221 downloads the link destination data from the link destination associated with the download instruction acceptance image B5, in addition to which the control unit 52 sends the downloaded link destination data to a download destination designated by the user, via the network interface unit 71 (S13). The downloaded link destination data is stored temporarily in the HDD 74 or a memory (not illustrated) and is used for the data transmission by the network interface unit 71.

Although not shown in FIG. 4, after the processing in S12, S9 and S13, the procedure returns to the processing in S4. In other words, the web display control unit 5223 causes the display unit 410 to display a web page display screen 4103 of the web page which has been shown until that time. Furthermore, as already described above, if the web display control unit 5223 accepts a screen close instruction due to the pressing of the screen close button B2 by the user which the web page display screen 4103 is being shown, then the web display control unit 5223 transfers to processing for displaying an initial operating screen 4101 by the panel application 5222.

Figure 8:
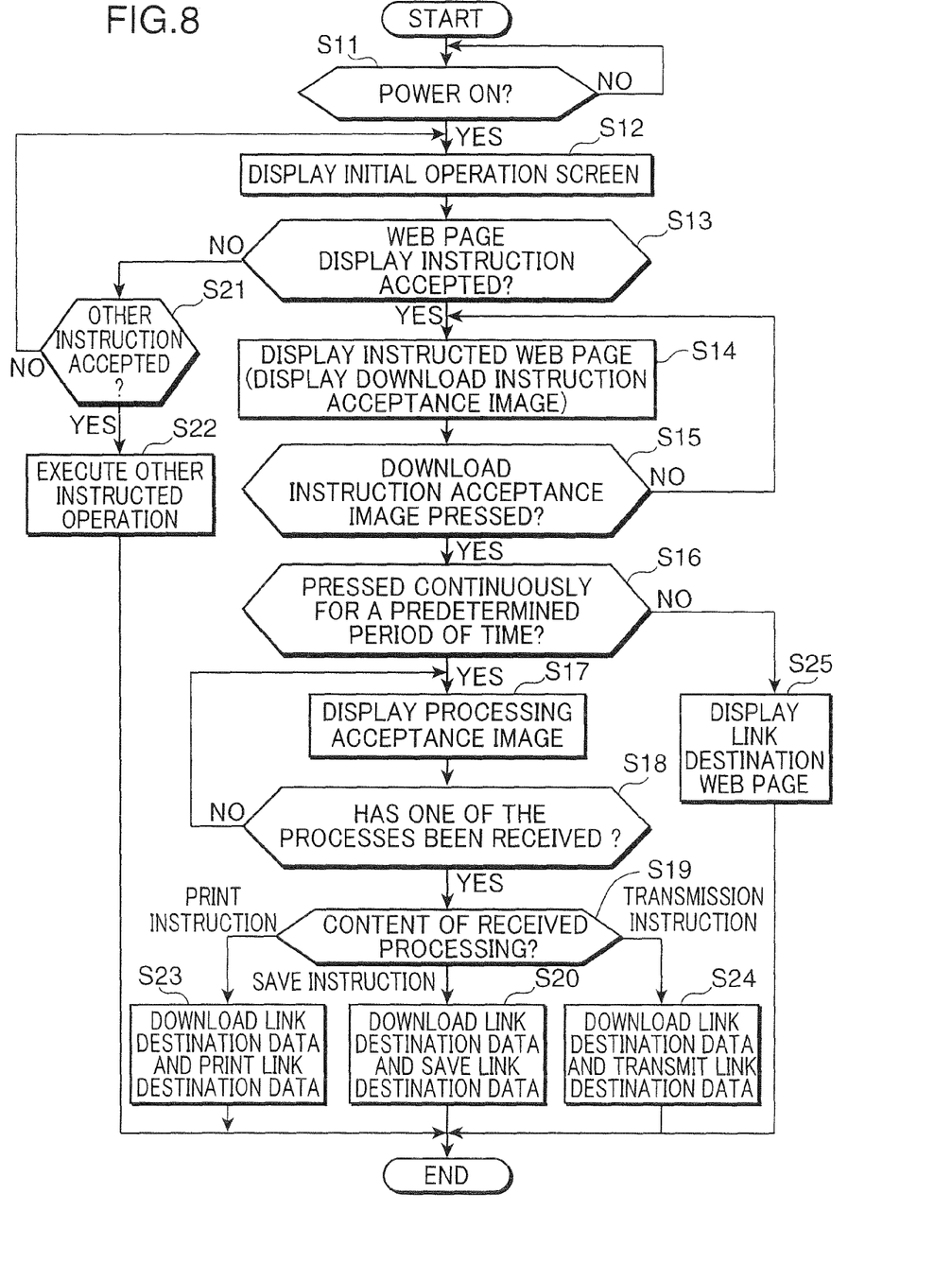
FIG. 8 is a flowchart showing a second embodiment of display control in a display unit of the composite machine.

Next, a second embodiment of display control in a display unit 410 of the composite machine 1 will be described. FIG. 8 is a flowchart showing a second embodiment of display control in a display unit 410 of the composite machine 1. Processing similar to that of the first embodiment is omitted from this description.

In this second embodiment, if the user presses the download instruction acceptance image B5 continuously for a predetermined period of time (for example, two seconds) (YES at S16), then the processing acceptance image display control unit 5226 causes a processing acceptance image B6 to be displayed on the display unit 410 (S17).

On the other hand, if the user has pressed down the download instruction acceptance image B5 for a period of time which is less than the aforementioned predetermined period of time (NO at S16), then the processing acceptance image display control unit 5226 does not display the processing acceptance image B6 on the display unit 410, and the web display control unit 5223 accesses the link destination associated with the download instruction acceptance image B5 and causes the web page screen of the link destination to be displayed on the display unit 410 (S25).

According to this second embodiment, the user is able to choose whether to display the processing acceptance image B6 on the display unit 410 or to display a link destination web page screen which has been linked to the web page being shown on the display unit 410, by performing an operation of changing the period of time during which the download instruction acceptance image B5 is pressed down. Therefore, if a hyperlink display is used as the download instruction acceptance image B5, then the display of the hyperlink is able to perform both a function of accepting an instruction for transferring the web page to a link destination, as normal, and a function of accepting a download instruction for the link destination data as described in the present embodiment.

The present invention is not limited to the composition of the embodiment described above and various modifications are possible. For example, in the first or the second embodiments described above, the web browser function unit 5221 was described as carrying out processes such as display processing of the download instruction acceptance image B5, download instruction acceptance processing, display processing for the processing acceptance image B6, acceptance processing for respective processes of printing, data saving or data transmission, and the like, but these processes are not limited to being carried out by an application known as a web browser, and may also be implemented by any application or circuit capable of executing the respective processes described above. In other words, in the present embodiment, the web browser function unit 5221 is a concept which includes an application or circuit capable of executing each of the respective processes described above.

Furthermore, the embodiments described above show embodiments of the display control apparatus, the image forming apparatus and the display control program relating to the present invention in FIG. 1 to FIG. 8, but these are no more than examples of the present invention, and the composition or processing, and the like, according to the present invention is not limited to these.

In summary, the present invention is a display control apparatus, comprising: a display unit which displays images; and a web browser function unit which causes the display unit to display a web page, wherein the web browser function unit comprises: an instruction acceptance image display control unit which displays, in a web page displayed on the display unit, a download instruction acceptance image for accepting from a user, by a touch panel function, an instruction for downloading link destination data from a link destination associated with a web page; a download instruction acceptance unit which accepts the download instruction in accordance with an operation performed by the user on the basis of the download instruction acceptance image; a processing acceptance image display control unit which causes the display unit to display a processing acceptance image for accepting from the user, by the touch panel function, one process to be performed of a predetermined plurality of processes in respect of the link destination data to be downloaded, when the download instruction is accepted by the download instruction acceptance unit; and a processing acceptance unit which accepts the selection of the one process of the plurality of processes in accordance with an operation performed by the user on the basis of the processing acceptance image.

Furthermore, the present invention is a computer-readable storage medium storing a display control program which causes a computer built into a display control apparatus to function as a web browser function unit that causes a display unit of the display control apparatus to display a web page; and which further causes the web browser function unit to function as: an instruction acceptance image display control unit which displays, in a web page displayed on the display unit, a download instruction acceptance image for accepting from a user, by a touch panel function, an instruction for downloading link destination data from a link destination associated with a web page; a download instruction acceptance unit which accepts the download instruction in accordance with an operation performed by the user on the basis of the download instruction acceptance image; a processing acceptance image display control unit which causes the display unit to display a processing acceptance image for accepting from the user, by the touch panel function, one process to be performed of a predetermined plurality of processes in respect of the link destination data to be downloaded, when the download instruction is accepted by the download instruction acceptance unit; and a processing acceptance unit which accepts the selection of the one process of the plurality of processes in accordance with an operation performed by the user on the basis of the processing acceptance image.

In these inventions, if a download instruction is accepted by the download instruction acceptance unit in accordance with an operation performed by the user on the basis of the download instruction acceptance image displayed by the instruction acceptance image display unit, while the web browser function unit is displaying a web page on the display unit, then the processing acceptance image display control unit causes the processing acceptance image to be displayed, and an instruction to carry out one process of the plurality of processes in respect of the downloaded link destination data is accepted by the processing acceptance unit in accordance with an operation performed by the user on the basis of the processing acceptance image. Therefore, the user is not required to perform a special operation in order to instruct the downloading of link destination data from a link destination which is linked to a displayed web page, when the web page is being displayed, and moreover, neither is the user required to carry out a complicated operation, such as calling up a screen for inputting an instruction for each type of process, in order to instruct which one of a plurality of processes is to be performed in respect of the link destination data.

Moreover, in the present invention, since the download instruction acceptance unit accepts an instruction for downloading link destination data from a link destination associated with the web page being displayed on the display unit, then it is possible to input, by means of a simple operation, an instruction for downloading data of various kinds stored in respective link destinations which are associated with respective web pages that are displayed.

For example, according to a conventional service coupon issuing system, even if a user operates a service coupon download button on a web page, this simply means that only an electronic document file for delivering the prescribed service coupon is obtained from a particular delivery document database associated with that service coupon download button, and therefore the only instruction that can be issued by operating the service coupon download button is for a download process of an electronic document file for service coupon delivery, but in the present invention, when a web page is being displayed on a display unit, such as an image forming apparatus, the user is able to input a download instruction in respect of data which is not limited to a predetermined database or data type in particular, and the user is also able to input instructions for various processes to be performed in respect of the downloaded data, without having to perform a laborious operation.

Furthermore, in the present invention, the processing acceptance image displayed by the processing acceptance image display control unit is an image for accepting from the user, by the touch panel function, one process to be performed out of printing, data saving or data transmission in respect of the link destination data, as the predetermined plurality of processes, and the processing acceptance unit accepts an instruction about which process out of printing, data saving or data transmission is to be performed in respect of the link destination data.

In this invention, since the processing acceptance unit accepts an instruction about which process out of printing, data saving or data transmission is to be performed in respect of the downloaded link destination data, in accordance with an operation performed by the user on the basis of the processing acceptance image, then the user is not required to perform a special operation in order to instruct the downloading of link destination data from a link destination which is linked to a displayed web page, while the web page is being displayed, and furthermore, neither is the user required to carry out a complicated operation, such as calling up a screen for inputting an instruction for each respective process, in order to input an instruction to carry out any one process of printing, data saving or data transmission in respect of the link destination data.

Furthermore, in the present invention, the processing acceptance image display control unit causes the display unit to display the processing acceptance image when the download instruction acceptance image is pressed by the user continuously for a predetermined period of time, and the web browser function unit further comprises a web display control unit which causes the display unit to display a screen of the link destination when the download instruction acceptance image is pressed by the user for a period of time that is less than the predetermined period of time.

According to this invention, by changing the period of time during which the download instruction acceptance image is pressed, the user is able to select whether to display the processing acceptance image on the display unit or to display the link destination web page screen which is linked to the web page being displayed.

Furthermore, the present invention is an image forming apparatus, comprising: a recording unit which records an image on a recording medium on the basis of data for printing; a control unit which controls an operation of the recording unit; and one of the respective display control apparatuses relating to the present invention described above, wherein, when an instruction for carrying out a printing process in respect of the link destination data is accepted by the processing acceptance unit, then the web browser function unit downloads the link destination data from the link destination, and the control unit causes the recording unit to record on the basis of the link destination data thus downloaded.

According to this invention, if an instruction for carrying out a printing process in respect of the link destination data is accepted by the processing acceptance unit, then the control unit causes the recording unit provided in the image forming apparatus to carry out recording on the basis of the downloaded link destination data, and therefore the user is able to cause the image forming apparatus to perform a series of processes involving the downloading and printing of link destination data which is linked to the web page being displayed, by means of a simple operation.

Furthermore, the present invention is an image forming apparatus, comprising: a storage unit which stores data; a control unit which controls an operation of the storage unit; and one of the respective display control apparatuses relating to the present invention described above, wherein, when an instruction for carrying out data saving process in respect of the link destination data is accepted by the processing acceptance unit, then the web browser function unit downloads the link destination data from the link destination, and the control unit causes the storage unit to store the link destination data thus downloaded.

According to this invention, if an instruction for carrying out a data saving process in respect of the link destination data is accepted by the processing acceptance unit, then the control unit causes the storage unit provided in the image forming apparatus to store the downloaded link destination data, and therefore the user is able to cause the image forming apparatus to perform a series of processes involving the downloading and data saving of link destination data which is linked to the web page being displayed, by means of a simple operation.

Furthermore, the present invention is an image forming apparatus, comprising: a data transmission unit which transmits data to a transmission destination designated by a user; a control unit which controls an operation of the data transmission unit; and one of the respective display control apparatuses relating to the present invention described above, wherein, when an instruction for carrying out a data transmission process in respect of the link destination data is accepted by the processing acceptance unit, then the web browser function unit downloads the link destination data from the link destination, and the control unit causes the data transmission unit to transmit the link destination data thus downloaded to the designated transmission destination.

According to this invention, if an instruction for carrying out a data transmission process in respect of the link destination data is accepted by the processing acceptance unit, then the control unit causes the data transmission unit provided in the image forming apparatus to carry out data transmission of the downloaded link destination data, and therefore the user is able to cause the image forming apparatus to perform a series of processes involving the downloading and transmission of link destination data which is linked to the web page being displayed, by means of a simple operation.

This application is based on Japanese Patent application serial No. 2008-305630 filed in Japan Patent Office on Nov. 28, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
a display unit which displays images; and
a web browser function unit which causes the display unit to display a web page,
wherein the web browser function unit comprises: an instruction acceptance image display control unit that displays, in the web page displayed on the display unit, download instruction acceptance images for accepting from a user, by a touch panel function, an instruction for downloading link destination data from a link destination associated with the web page displayed on the display unit; a download instruction acceptance unit that accepts the download instruction in accordance with an operation performed by the user on the basis of the download instruction acceptance images; a processing acceptance image display control unit that causes the display unit to display a processing acceptance image having a print instruction acceptance image, a data saving instruction acceptance image and a data transmission instruction acceptance image for accepting from the user, by the touch panel function, an instruction to perform respectively a process of printing, a process of data saving and a process of data transmission to a predetermined personal computer in respect of the link destination data to be downloaded, when the download instruction is accepted by the download instruction acceptance unit; and a processing acceptance unit which accepts the process of printing when pressing the print instruction acceptance image, the process of data saving when pressing the data saving instruction acceptance image, and the process of data transmission when pressing the data transmission acceptance image, wherein, when all hyperlink images that transfer screen to link destinations that are linked to the web page in the web page displayed on the display unit are the download instruction acceptance images, respectively, the processing acceptance image display control unit causes the display unit to display the processing acceptance image having the print instruction acceptance image, the data saving acceptance image and the data transmission acceptance image for the link destination of a hyperlink image operated for the download instruction in all of the hyperlink images, the image forming apparatus further comprising:
a data transmission unit that transmits data to the predetermined personal computer; and
a control unit that controls an operation of the data transmission unit; and
wherein, when the processing acceptance unit accepts the process of data transmission by pressing the data transmission instruction acceptance image, then the web browser function unit downloads the link destination data from the link destination, and the control unit causes the data transmission unit to transmit the link destination data thus downloaded to the predetermined personal computer.

2. A non-transitory computer-readable recording medium storing a display control program which causes a computer built into an image forming apparatus to function as a web browser function unit that causes a display unit of the image forming apparatus to display a web page;

and which further causes the web browser function unit to function as: an instruction acceptance image display control unit that displays, in the web page displayed on the display unit, a download instruction acceptance images for accepting from a user, by a touch panel function, an instruction for downloading link destination data from a link destination associated with the web page displayed on the display unit; a download instruction acceptance unit that accepts the download instruction in accordance with an operation performed by the user on the basis of the download instruction acceptance images; a processing acceptance image display control unit that causes the display unit to display a processing acceptance image having a print instruction acceptance image, a data saving instruction acceptance image and a data transmission instruction acceptance image for accepting from the user, by the touch panel function, an Instruction to perform respectively a process of printing, a process of data saving and a process of data transmission to a predetermined personal computer respectively in respect of the link destination data to be downloaded, when the download instruction is accepted by the download instruction acceptance unit; and a processing acceptance unit which accepts the process of printing when pressing the print instruction acceptance image, the process of data saving when pressing the data saving instruction acceptance image, and the process of data transmission when pressing the data transmission acceptance image, wherein, when all hyperlink images that transfer screen to link destinations that are linked to the web page in the web page displayed on the display unit are the download instruction acceptance images, respectively, the processing acceptance image display control unit causes the display unit to display the processing acceptance image having the print instruction acceptance image, the data saving acceptance image and the data transmission acceptance image for the link destination of a hyperlink image operated for the download instruction in all of the hyperlink images, the computer-readable recording medium storing the display control program which causes the computer built into the image forming apparatus to further function as:

a data transmission unit which transmits data to the predetermined personal computer; and a control unit which controls an operation of the data transmission unit; and wherein, when the processing acceptance unit accepts the process of data transmission by pressing the data transmission instruction acceptance image, then the web browser function unit downloads the link destination data from the link destination, and the control unit causes the data transmission unit to transmit the link destination data thus downloaded to the predetermined personal computer.

\* \* \* \* \*